Aug. 6, 1940.                H. J. CRINER                 2,210,527
                        BREAD SLICING MACHINE
                      Filed Dec. 17, 1938         2 Sheets-Sheet 2
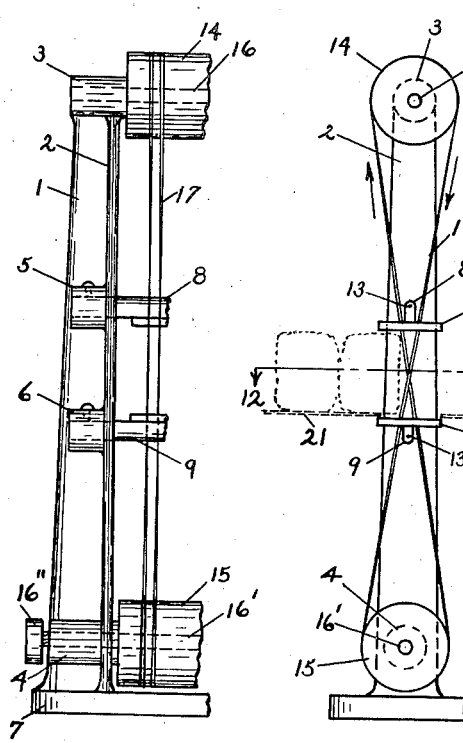
Fig-9   Fig-10
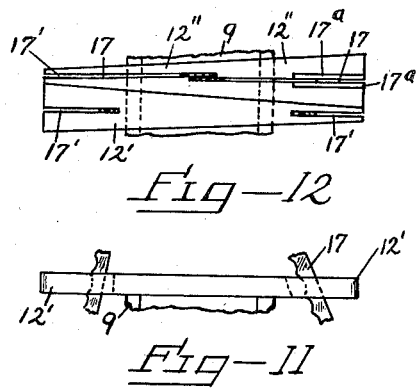
Fig-12
Fig-11
Harry J. Criner, INVENTOR.
BY
Bush Bush ATTORNEYS.

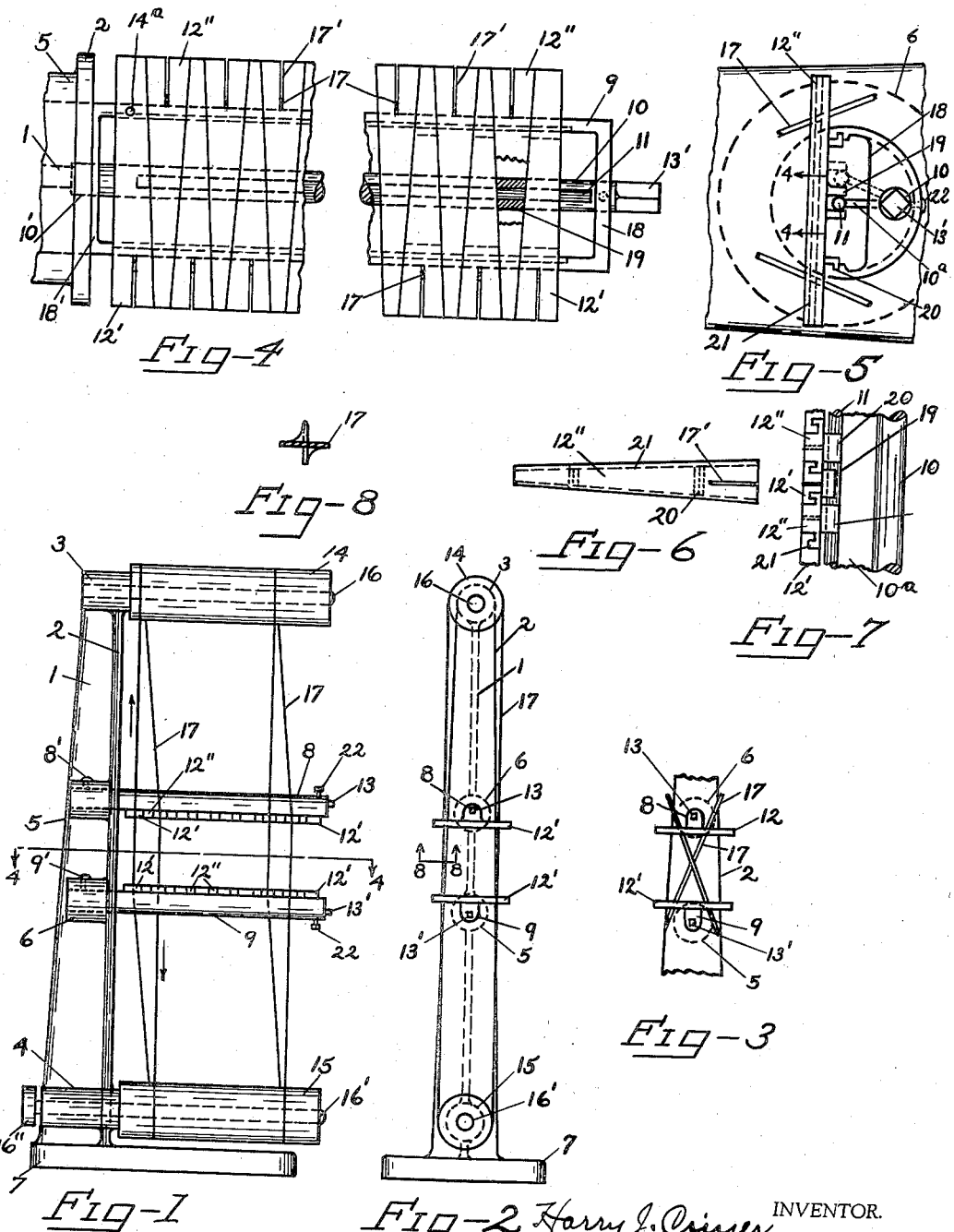

Patented Aug. 6, 1940

2,210,527

UNITED STATES PATENT OFFICE 2,210,527

BREAD SLICING MACHINE

Harry J. Criner, Davenport, Iowa, assignor of one-half to A. G. Bush, Davenport, Iowa Application December 17, 1938, Serial No. 246,407

23 Claims. (Cl. 146—88)

My invention relates to bread slicing machines of the band-blade type and the main objects of my invention are to provide a bread slicing machine in which endless bands may be mounted upon spaced drums or pulleys in either figure 8, crossed, or uncrossed form in a way to avoid the strain upon the blades incident to the pressure of the guides which are utilized to direct the blades in their cutting courses, and in which the strain upon the blade guides is relieved by causing the cutting courses of the blades to travel in line with the slots of the guides without lateral pressure of the guides thereon excepting such pressure as may be needed to give the slight additional twist to the cutting courses of the blades necessary to hold the cutting courses in parallel planes; to provide an improved means for simultaneously adjusting the lateral spacing of the blade guides; to provide blade guides which will lie in parallel planes and form parts of feed and discharge tables for the bread to rest upon and parts of retaining tables to retain the bread against upward displacement while undergoing the slicing process; to provide a form of mounting thin slicing blades upon spaced parallel drums in such a way that the two cutting courses of each blade crossed midway of the drums will be utilized to form each cut in a given loaf of bread; to mount the blades so that the cutting edges of the blades in their cutting courses will be turned in the same direction and the cutting courses will cross at a point approximately lying in a vertical line extending between the middle line of the blades as they pass around the opposite sides of the drums; to provide a form of band-blade in which an uncrossed, twisted blade may be mounted upon a pair of spaced drums and the natural movement of the blade as so mounted will cause the cutting edges of both cutting courses thereof to be turned in the same direction and at right angles midway between the drums, to the axes of the drums; to provide an improved mechanical movement for simultaneously adjusting the spacing of a plurality of parts arranged in series.

Other objects will be apparent from the description.

I attain these objects by the means illustrated in the accompanying drawings, in which, Figure 1 is a front elevation of one form of my machine;

Figure 2 is a side elevation of my machine, but showing the blades uncrossed;

Figure 3 is an enlarged detail showing crossed blades;

Figure 4 is an enlarged fractional detail plan view of the lower set of blade guides forming the intermediate bread supporting table with a part of the outermost guide broken away and showing in section the lugs which straddle the adjusting rod;

Figure 5 is an end view of Figure 4;

Figure 6 is an enlarged detail of one of the stationary guides and Figure 7 is an enlarged detail showing a rear view of the stationary guide 10 shown in Figure 6, with movable guides adjacent thereto, and the adjusting rod and the shaft carrying same, but with the semi-cylindrical arm 9 omitted;

Figure 8 is an enlarged detail view showing a cross-sectional view of a twisted course of one blade, as shown in Figures 9 to 11;

Figure 9 is a fractional front elevation of an alternate form of machine in which two cutting courses of the blades severally are utilized to make each several cuts in a given loaf of bread;

Figure 10 is a side elevation of Figure 9;

Figure 11 is an enlarged detail side view of one of the stationary guides; and

Figure 12 is an enlarged detail showing the top of one stationary and of one movable guide with the cutting courses of each blade in line and showing the crossing point of one of the blades in section on the line 12—12 of Figure 10.

My machine comprises a base 7 with a vertical frame 1 T-shaped in section united thereto and having drive shafts 16—16' revolvably mounted therein, one of the shafts carrying a suitable drive pulley 16" as shown in Figure 9, or being otherwise connected to a prime mover.

Suitable bosses 3 and 4 are formed integral with the frame 1 to afford bearings for the shafts 16—16'. The frame and the bosses and the shafts are preferably made heavy enough to support the drums 14 and 15, but if desired, the shafts 16—16' may be extended beyond the drums and connected by an additional frame member to give greater rigidity.

The upper shaft 16 is preferably mounted in an eccentric bearing so as to permit adjustment toward or away from the lower shaft, but as such bearings are well known in the art, I make no claim in this application for that feature.

Additional bosses 5 and 6 are formed integral with the frame 1 which support transverse semi-cylindrical arms 8 and 9.

A plurality of band-blades 17 are mounted upon the pulleys 14 and 15 may be carried in their crossed or uncrossed relation and the blades themselves may be formed of untwisted steel strips welded or otherwise suitably united at their ends, or each strip from which a blade is made may be twisted before uniting the ends thereof by holding one end of the strip stationary and giving the other end of the strip one complete rotation upon its longitudinal axis and uniting the ends of the strip by welding or other suitable means, it being understood, of course, that the joint or union where the ends of the strip are united will be reduced in thickness by previous beveling or by grinding or other suitable means after they are united so that the joint will not be materially thicker than the remainder of the blade.

Various methods may be utilized for uniting the ends of the strips to form the blades, but I prefer to cut the ends of the strips on oblique lines, bevel the cut portions, overlapping the beveled portions and then unite them by suitable soldering or brazing material such as German silver, or spot-weld them.

In making the joints in this way, it is possible to leave a portion of each blade unaffected by the heat used for joining them and thus reduce breakage at or close to the line of junction.

The semi-cylindrical arms 8 and 9 are formed with longitudinal grooves on their inner faces near their edges into which tongues 20 extend as shown in Figure 5. The tongues 20 are formed integral with or united to the fixed guides 12'.

The fixed guides 12' alternate with movable guides 12". All of these guides are wedge-shaped and are freely slidable longitudinally upon the edges of the semi-cylindrical arms 8 and 9.

The so-called fixed guides are fixed merely with relation to movement transversely of the semi-cylindrical arms 8 and 9, but are freely movable longitudinally of these arms. The movable guides 12" are freely movable longitudinally of the arms 8 and 9, and are also movable transversely of those arms within fixed limits. The adjacent edges of the guides 12' and 12" are formed with interlocking tongues and grooves as shown in Figure 7, whereby the movable guides 12" may be freely moved longitudinally and whereby the action of the tongues and grooves will unite all the guides in the lower series so that when the movable guides are moved in one direction, it will force the fixed guides apart laterally and when they are moved in the opposite direction, it will draw the fixed guides together laterally.

In order to move the movable guides 12" transversely of the arm 9, I unite partitions or walls 18 and 18' to the arm 9. In the partitions 18 and 18' bores are formed in which a shaft 10 is mounted having a square head 13' at its outer end by which it may be revolved. A rib 10a is united to and extends lengthwise of the shaft 10 bearing upon its upper edge the adjusting rod 11.

Lugs 19 are united to the lower faces of the movable guides 12" on opposite sides of the adjusting rod 11 so that when the shaft 10 is turned in either direction, it will carry the rib 10a and the rod 11, and the rod 11 will carry with it the lugs 19 and thereby the movable guides 12".

In Figure 5 I have shown in dotted lines the rod 11 and the lugs 19 and rib 10a as moved in one direction by rotating the shaft 10.

In assembling the lower series of guides, the guides are joined together by assembling the tongues and grooves and by then sliding the entire assembly upon the adjusting rod 11 and the upper edges of the arm 9. When in place, the innermost fixed guide 12' may be locked in stationary position by a pin 14a or other suitable means.

When so assembled, it is obvious that the tongues 20 will secure the fixed guides 12' against removal upwardly from the arm 9 and the interlocking tongues and grooves of the fixed and movable guides will prevent the movable guides from removal upwardly from the fixed guides.

The arrangement of the guides, adjusting rod and shaft in connection with the arm 8 is the opposite of that just described and will prevent the series of guides from falling out of the arm 8.

The lower series of guides is mounted a short distance below the crossing point of the blades as shown in Figure 10 and may be level with or just below a feed table or chute 21 to feed the bread to the cutting blades as shown in Figure 10.

The upper series of guides is preferably mounted approximately at the height of the tops of the loaves as shown in Figure 10 so as to form a retaining plate to hold the loaves against upward displacement.

The crossed blades may be run in either direction but when using the form shown in Figure 1, I prefer to run the blades in the directions shown by the arrows. When so operated, the action of the blades as they first come into contact with the bread will tend to spread the loaf rather than compress it and will prevent jamming of the bread.

In Figure 1 the blades are shown traveling in crossed figure 8 form, but with the spacing of the middle of the blades greatly exaggerated for clearness.

As shown in that figure, the blades will tend to travel in vertical lines in the courses extending from the lower guides to the upper drum and in vertical lines in the courses extending from the upper guides to the lower drum, but in oblique lines from the lower drum to the lower guides and from the upper drum to the upper guides.

To spread the blades apart the thickness of a slice of bread in their cutting courses when the blades are under the necessary tension requires considerable pressure which causes undesirable friction and heating and has a tendency to harden the blades and make them brittle, thus shortening their life and increasing the liability to breakage.

It is obvious that when blades are mounted in the form shown in Figures 9 and 10, the natural action of the blades in making the twist intermediate the pulleys, will bring the blades into parallel and close together at their crossing points and that no pressure of the guides is necessary to accomplish this purpose, although in order to hold them in the same parallel plane through their cutting courses, guides are necessary to keep the blades from twisting out of parallel while traveling through such courses.

Experience shows that the pressure necessary to prevent this twisting action through the cutting courses is very much less than the pressure required to separate the blades as in Figure 1, but the slicing cuts through the bread must be very narrow, and in order to have both cutting courses of a single blade travel through a single slicing cut, the blades must be made very thin. I accordingly prefer to form my blades having a thickness of approximately ten thousandths (.010") of an inch so that the thickness of the two blades at their crossing point will not exceed twenty thousandths (.020") of an inch, which is thin enough to be entirely practical and which will not cause jamming or distortion of the loaves while being sliced.

In the forms shown in Figures 1 and 9, the band-blades may be formed in the usual way by uniting the ends of an untwisted strip of steel. When so mounted, the cutting edges of the blade while passing through the two cutting courses will be turned in the same direction.

I have also found that by forming a blade from a twisted strip of steel as described above, the blade may be allowed to travel around the pulleys in uncrossed form, but with the cutting edges while traveling through the cutting courses of the blade, turned in the same direction, and when so formed, the blades may be mounted so that the two cutting courses of a given blade will travel through the same slicing cut of the loaf or they may be spaced so as to travel through successive cuts.

In Figure 12, I have shown each guide with slots 17' near opposite ends thereof lying in a single plane so that each guide will guide a given blade with its cutting courses traveling through a single slicing cut.

My guides are preferably made of metal such as duralumin or other suitable material and in order to reduce friction to a minimum, bearing pieces 17a may be inserted on each side of the slots 17' to contact the blades. These bearing pieces may be of Pyrex glass or glass-hardened steel or other suitable material having a hardness sufficient to prevent wear and to limit friction so far as possible, and preferably formed with parallel flat faces of sufficient width to prevent or reduce wear thereon.

In the operation of my device, the machine is set up with guides in place. The band-blades are then mounted upon the drums and inserted in the guides and the drums adjusted to secure the proper tension. The drums are driven by the pulley 16'' or other prime mover and the bread is fed to the blades upon the chute 21, and the guides 12' and 12'', where it is sliced in the usual way. The wedge-shape of the interconnected guides makes it possible to widen or narrow the table formed by the guides for varying length of loaves.

Obviously any suitable form of feed and discharge table may be utilized in addition to the intermediate table which is formed by the lower series of guides.

It will be noticed that the lower series of spacing members are formed with flat upper faces which lie in a common horizontal plane and may be utilized as a table to support the bread while being sliced; also that the movement of the wedges to change the spacing of the blades will simultaneously and automatically vary the width of this table proportionately. When the spacing of the blades is widened, the table will be widened and when the spacing of the blades is contracted, the table will be narrowed to correspond. A similar action will take place in the upper series of guides to act as a retainer for the bread.

In the claims for clearness I use the term "twisted blade" to indicate a blade formed by twisting a straight strip of metal of the proper length so as to give one end thereof a complete rotation on its longitudinal axis while holding the other end in fixed position and then uniting the ends so as to retain the twist in the completed band, the twist being so distributed that one-half of it will lie between and on one side of the spaced drums and the other half of the twist will lie between the other side of the spaced drums.

In the claims, unless otherwise indicated, I also use the term "fixed guides" to indicate the guides which are secured against movement transversely of the arms 8 and 9, but are free to move longitudinally of such arms, and the term "movable guides" to indicate the guides which are movable both longitudinally and transversely of the arms 8 and 9.

I also use the term "tongued and grooved" as applied to the guides to indicate the interlocking tongues and grooves formed on all the adjacent edges of all the guides as shown in the drawings.

It is obvious that various modifications in the form and proportion of various parts of my machine may be made without departing from the spirit of my invention and I do not limit my claims to the precise forms shown and described.

I claim:

1. In a bread slicing machine comprising a supporting frame, a pair of parallel spaced drums revolvably mounted on the frame, a plurality of endless band slicing blades mounted upon the drums in figure 8 form and crossing substantially midway of the drums, a pair of opposed parallel transverse arms united to the frame spaced above and below the crossing point of the blades, a series of alternating fixed and movable, flat, wedge-shaped, tongued and grooved guides mounted upon the lower arm, the innermost guide being rigidly secured to the arm and all the other guides of the series being freely movable longitudinally thereof, and with slots formed in the guides to receive, twist, space and guide the blades in their cutting courses, a pair of spaced lugs united to each of the movable guides, an adjusting shaft revolvably mounted in the lower arm having a longitudinal rib extending to and between the paired lugs on the movable guides to shift said guides transversely of the arm, a similar series of tongued and grooved guides and lugs and an adjusting shaft similarly mounted on the upper arm but in reverse position, and means for manually revolving the adjusting shafts for limited distances in either direction.

2. A mechanism as described in claim 1, and means for locking the adjusting shafts in various adjusted positions.

3. A mechanism as described in claim 1, and means for locking the guides in various adjusted positions.

4. A mechanism as described in claim 1, the lower guides forming a suitable support for the loaves of bread while passing the blades for slicing.

5. A mechanism as described in claim 1, the lower guides forming a suitable support for the loaves of bread while passing the blades for slicing and the upper guides acting as retainers to limit upward displacement of the loaves.

6. A mechanism as described in claim 1, the fixed guides being secured against accidental removal from the arms by tongues united to the fixed guides and slidable in longitudinal grooves formed in the arms.

7. A mechanism as described in claim 1, and means to prevent accidental displacement of the guides from the arms.

8. A bread slicing machine comprising a supporting frame, a pair of parallel spaced drums revolvably mounted on the frame, a plurality of endless band slicing blades mounted upon the drums, a pair of opposed parallel transverse spaced arms supported by the frame approximately midway of the drums, a series of alternating fixed and movable, wedge-shaped, interconnected guides mounted upon the lower arm, the innermost guide being rigidly secured to the arm and all the other guides of the series being freely movable longitudinally thereof and with slots formed in the guides to receive, twist, and guide the blades in their cutting courses, a pair of spaced lugs united to each of the movable guides, an adjusting shaft revolvably mounted in the lower arm having a longitudinal rib extending to and between the paired lugs on the movable guides to shift said guides transversely of the arm, a similar series of tongued and grooved guides and lugs and an adjusting shaft similarly mounted on the upper arm but in reverse position, and means for manually revolving the adjusting shafts for limited distances in either direction.

9. A mechanism as described in claim 8, and means for locking the guides in various positions of adjustment.

10. A bread slicing machine comprising a supporting frame, a pair of parallel spaced drums revolvably mounted on the frame, a plurality of twisted band-blades mounted upon the drums each of said blades having two cutting courses traveling intermediate the drums in a single plane transverse to the drums, a series of alternating fixed and movable, wedge-shaped guides mounted upon the lower arm, the innermost fixed guide being rigidly united to the arm and all the other guides of the series being freely slidable on the arm longitudinally thereof, slots formed in both ends of each of the respective guides on the same longitudinal axis thereof to receive both cutting courses of the respective blades, a pair of spaced lugs united to each of the movable guides, an adjusting shaft revolvably mounted in the lower arm having a longitudinal rib extending to and between the paired lugs on the movable guides to shift said guides transversely of the arm, a similar series of wedge-shaped guides and lugs and an adjusting shaft similarly mounted on the upper arm but in reverse position, and means for manually revolving the adjusting shafts for limited distances in either direction.

11. A mechanism as described in claim 10, and means for locking the guides in various adjusted positions.

12. A mechanism as described in claim 10, the lower guides forming a suitable support for the loaves of bread while passing the blades for slicing and the upper guides acting as retainers to limit upward displacement of the loaves.

13. In a bread slicing machine comprising a supporting frame, a pair of parallel spaced drums revolvably mounted on the frame, a pair of opposed spaced parallel transverse arms united to the frame intermediate the drums, a series of alternating, fixed and movable, wedge-shaped, tongued and grooved guides mounted upon the lower arm, the innermost guide being rigidly secured to the arm and all the other guides of the series being freely movable longitudinally thereof, and with slots formed in the guides to receive, twist, and guide the blades in their cutting courses, a pair of spaced lugs united to each of the movable guides, an adjusting shaft revolvably mounted in the lower arm having a longitudinal rib extending to and between the paired lugs on the movable guides to shift said guides transversely of the arm, a similar series of tongued and grooved guides and lugs and an adjusting shaft similarly mounted on the upper arm but in reverse position, means for manually revolving the adjusting shafts for limited distances in either direction, means for locking the adjusting shafts in various adjusted positions, and a plurality of twisted band-blades mounted upon the drums in un-crossed position, and with two cutting courses of each blade running intermediate the drums in a single plane transverse and perpendicular to the axes of the drums.

14. In a bread slicing machine comprising a supporting frame, a pair of parallel spaced drums revolvably mounted on the frame, a pair of opposed parallel transverse arms united to the frame intermediate the drums, a plurality of twisted band-blades mounted upon the drums in uncrossed position with two cutting courses of each several blade running intermediate the drums in a single plane respectively transverse and perpendicular to the axes of the drums, in combination with guides to aid in twisting the blades and to guide the cutting courses thereof in such planes respectively.

15. A mechanical movement for uniformly and simultaneously adjusting the spacing of a plurality of blades or other parts, comprising a support, two opposed series of flat fixed and movable wedge-shaped guides mounted thereon in alternation and forming a supporting table, slots in the guides to engage the blades or other parts to be spaced, pairs of spaced lugs united to the movable guides respectively, a shaft pivoted on the support, a rib united to the shaft extending between and engaging the paired lugs on each movable guide, and means for manually rotating said shaft within certain limits whereby the table will be widened or narrowed by the movement of the movable guides.

16. A mechanical movement as described in claim 15, and means for locking the guides in their adjusted positions.

17. A mechanical movement as described in claim 15, and a set screw threaded in the arm to bear against the shaft and lock it in any adjusted position.

18. A mechanical movement for uniformly and simultaneously adjusting the spacing of a plurality of blades and other parts, comprising an arm, a series of alternating, fixed and movable, tongued and grooved guides mounted thereon, pairs of spaced lugs united to the movable guides respectively, a shaft pivoted in the arm, slots in the guides to engage the blades or other parts to be spaced, a rib united to the shaft extending between and engaging the paired lugs on each movable guide, and means for manually rotating said shaft within certain limits, the fixed guides being secured against accidental removal from the arms by tongues united to the fixed guides and slidable in longitudinal grooves formed in the arms.

19. In a bread slicing machine, the combination with a supporting frame, of a pair of spaced drums revolvably mounted on the frame, a plurality of endless band-blades mounted upon the drums in spaced relation, and a table to support the loaves while being sliced comprising a support, a plurality of flat-faced wedge-shaped members slidably interlocked in series with alternating members pointing in opposite directions mounted upon the support with one terminal member rigidly secured in fixed position and all of the other terminal members slidable transversely of the machine, means for moving transversely of the support in a common plane all members pointing in one direction toward or away from those pointing in the opposite direction to widen or narrow the space occupied by the entire series.

20. In a bread slicing machine, a table to support the loaves while being sliced comprising a support, a plurality of flat wedge-shaped members slidably interlocked in series with alternate members pointing in opposite directions mounted upon the support with the faces of all the members lying in a common plane with a terminal member rigidly united to the support and all the other members slidable lengthwise of the support, in combination with means for moving transversely of the support in said common plane all the members pointing in one direction toward or away from those pointing in the opposite direction to widen or narrow the space occupied by the entire series.

21. Adjusting means for adjusting the relative spacing of a plurality of blades or similar parts, comprising two series of cooperating and interlocking, wedge-shaped members, movable relatively in a single plane in opposite directions, the small ends of the wedges of one series being directed in an opposite direction to those of another series, and the individual wedge-shaped members being constructed and arranged to engage and guide the blades or similar parts.

22. Adjusting means for adjusting the relative spacing of a plurality of blades or similar parts, comprising two series of cooperating and interlocking, wedge-shaped members, movable relatively both longitudinally and transversely in a single plane in opposite directions, the small ends of the wedges of one series being directed in an opposite direction to those of another series, and the individual wedge-shaped members being constructed and arranged to engage and guide the blades or similar members.

23. The combination with adjusting means for cutting blades of bread slicing machines and the like, of two series of cooperating and interlocking, wedge-shaped members, movable relatively in a single plane in opposite directions, the small ends of the wedges of one series being directed in an opposite direction to those of another series, and the individual wedge-shaped members being constructed and arranged to engage and guide the blades or similar members during their longitudinal movement, and means for changing the relative position of the cooperating series to each other whereby the spacing of the blades may be increased or diminished.

HARRY J. CRINER.